(12) United States Patent
Jas et al.

(10) Patent No.: US 7,861,116 B2
(45) Date of Patent: Dec. 28, 2010

(54) DEVICE, SYSTEM, AND METHOD FOR OPTIMIZED CONCURRENT ERROR DETECTION

(75) Inventors: Abhijit Jas, Austin, TX (US); Srinivas Patil, Austin, TX (US); Rajesh Galivanche, Saratoga, CA (US); Ramtilak Vemu, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 394 days.

(21) Appl. No.: 11/967,674

(22) Filed: Dec. 31, 2007

(65) Prior Publication Data

US 2009/0172529 A1 Jul. 2, 2009

(51) Int. Cl.
*G06F 11/00* (2006.01)
(52) U.S. Cl. .............................. 714/27; 714/30; 714/45
(58) Field of Classification Search .................... 714/27
See application file for complete search history.

(56) References Cited

U.S. PATENT DOCUMENTS

| 4,697,241 | A | * | 9/1987 | Lavi | 703/15 |
|---|---|---|---|---|---|
| 4,932,028 | A | * | 6/1990 | Katircioglu et al. | 714/45 |
| 5,633,813 | A | * | 5/1997 | Srinivasan | 703/14 |
| 5,870,588 | A | * | 2/1999 | Rompaey et al. | 703/13 |
| 5,909,375 | A | * | 6/1999 | McClintock et al. | 716/6 |
| 6,117,180 | A | * | 9/2000 | Dave et al. | 703/20 |
| 6,577,150 | B1 | * | 6/2003 | Nishimura | 324/765 |
| 6,868,350 | B2 | * | 3/2005 | Zimmermann et al. | 702/65 |
| 7,027,981 | B2 | * | 4/2006 | Bizjak | 704/225 |
| 7,376,904 | B2 | * | 5/2008 | Cifra et al. | 715/763 |
| 7,389,460 | B1 | * | 6/2008 | Demara | 714/733 |
| 2005/0107065 | A1 | * | 5/2005 | Bernhart | 455/405 |
| 2005/0278154 | A1 | * | 12/2005 | Abebe et al. | 703/2 |

OTHER PUBLICATIONS

H. Hollander, Mar. 1995, Synthesis of SEU-tolerent ASICs using concurrent error correction, IEEE.*
Debaleena Das, Nur A. Touba "Synthesis of Circuits with Low-Cost Concurrent Error Detection Based on Bose-Lin Codes" Springer Netherlands, vol. 15, Nos. 1-2 / Aug. 1999.
Smruti R. Sarangi, Abhishek Tiwari, Josep Torrellas "Phoenix: Detecting and Recovering from Permanent Processor Design Bugs with Programmable Hardware" IEEE Computer Society Washington, DC, USA, 2006.

(Continued)

*Primary Examiner*—Scott T Baderman
*Assistant Examiner*—Kamini Patel
(74) *Attorney, Agent, or Firm*—Blakely, Sokoloff, Taylor & Zafman LLP

(57) ABSTRACT

A method, apparatus and system for accepting a plurality of user-selected properties pre-designated for detecting errors in portions of a circuit, accepting a plurality of user-selected erroneous outputs, each of which may correspond to one of the plurality of user-selected set of properties, executing a simulation of the circuit for each of the plurality of user-selected properties, detecting in the output of the simulation, one of the plurality of user-selected erroneous outputs of the circuit for the corresponding one of the plurality of user-selected properties, and performing error correction on the circuit for the corresponding one of the plurality of user-selected properties. A method, apparatus and system for automatically selecting a subset of a set of inputs which when input into a circuit simulation generate erroneous output data to a primary output of the circuit and performing error correction on the circuit therewith. Other embodiments are described and claimed.

13 Claims, 4 Drawing Sheets

OTHER PUBLICATIONS

Makris, Y. Bayraktaroglu, I. Orailoglu, A. "Invariance-based on-line test for RTL controller-datapath circuits" VLSI Test Symposium, 2000. Proceedings. 18th IEEE.

Kevin Reick, Pia N. Sanda, Scott Swaney, Jeffrey W. Kellington, Michael Floyd, Daniel Henderson "Fault—Tolerant Design of the IBM POWER6™ Microprocessor" IBM System Group, Austin, TX, 2007.

Bella Bose, Der Jei Lin "Systematic Unidirectional Error-Detecting Codes" IEEE Transactions on Computers, vol. 34, Issue 11 (Nov. 1985).

De, K. Natarajan, C. Nair, D. Banerjee, P. "RSYN: a system for automated synthesis of reliable multilevelcircuits" Very Large Scale Integration (VLSI) Systems, IEEE Transactions on, Jun. 1994.

* cited by examiner

DEVICE, SYSTEM, AND METHOD FOR OPTIMIZED CONCURRENT ERROR DETECTION

BACKGROUND OF THE INVENTION

Increased requirements for Reliability-Availability-Serviceability (RAS) or other rating for servers, desktops and other computers may increase the need for low-cost error detection schemes. RAS requirements may result from intrinsic needs of certain market segments (e.g., including mission critical application domains such as aviation, medical and financial transactions processing) as well as from projections for increased reliability of complex designs of the future.

The ability to integrate complex cores that may be both homogeneous (e.g., multi-core and/or many-core) and heterogeneous (e.g., system-on-a-chip (SOC)) may result in increased complexity and cost in circuit design verification, validation and/or testing. In conjunction with possibly less reliable manufacturing processes of the future (e.g., due to higher device sensitivity to process variations) and an inability to test and validate all manufacturing defects and design errors prior to shipment (e.g., at time-0), field failures may increase. As a result, field failures in circuits may be inevitable and may be detected and corrected in the field (e.g., while the system is running) in a user-transparent fashion. Concurrent Error Detection (CED) mechanisms may detect a malfunction of a system by a monitor while the system is running. When an error is detected several steps may be taken to correct the error.

A fault model may be used to analyze (e.g., using simulation) the effect of (e.g., physical and/or silicon) defects in a circuit. Techniques exist for detecting faults and/or errors in a datapath of a circuit (e.g., using residue codes) at a relatively low cost. However, some techniques for detecting faults and/or errors for random control logic are inefficient and costly. Much research effort in the past three decades has focused on finding CED techniques for random control logic that guarantee 100% detection of single stuck-at faults. A single stuck-at fault model is a widely used model for evaluating the effectiveness of an error detection technique. The model may assume that one signal in a circuit is "stuck" at 1 or 0 and that the signal value does not change with time. Typically, these techniques require very high area overhead. The partial protection of hardware is a paradigm that is increasingly gaining importance in the industry. The partial protection scheme attempts to protect the most important parts of a design at low-cost.

BRIEF DESCRIPTION OF THE DRAWING

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

Figure 1:
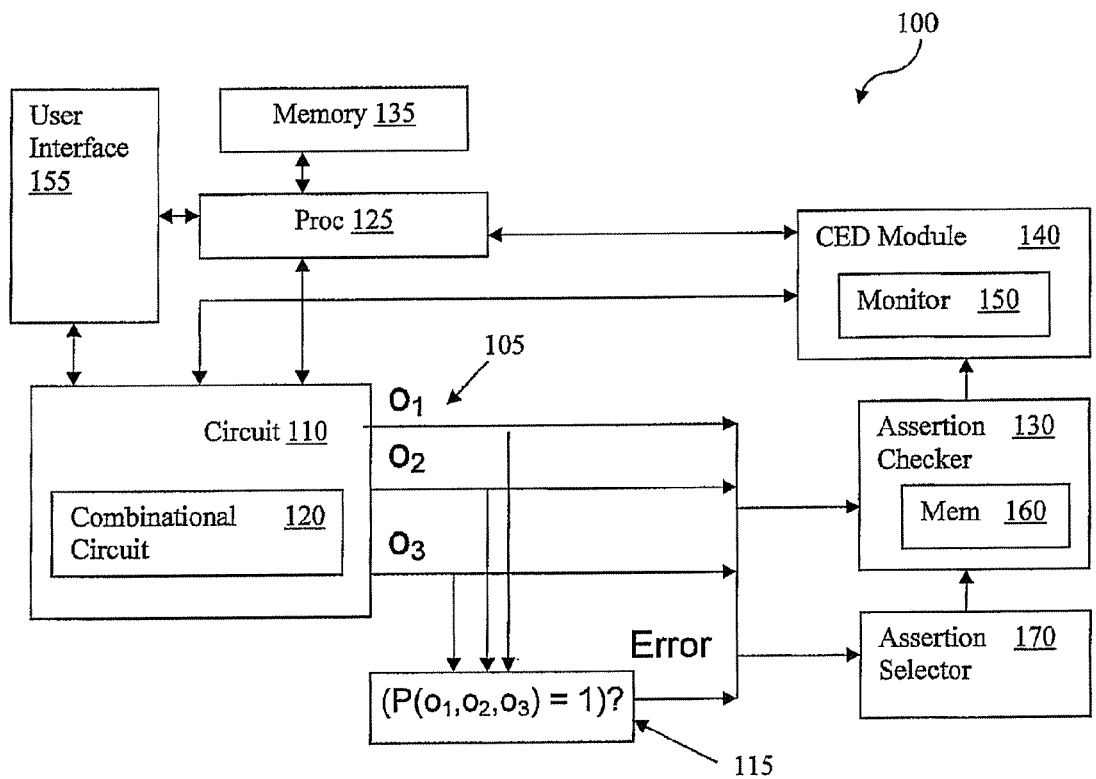
FIG. 1 is a schematic illustration of a CED mechanism for protecting a system 100 using assertions according to an embodiment of the present invention.

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF THE INVENTION

In the following detailed description, numerous specific details are set forth in order to provide a thorough understanding of the invention. However it will be understood by those skilled in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more components, devices, elements, parameters and the like.

Embodiments of the present invention may provide a CED mechanism or other system for detecting errors in a circuit with possibly minimal overhead by observing a partial portion of the paths in the circuit. For example, a mechanism may test a minimal number of crucial inputs and outputs (e.g., or a combination thereof, referred to as assertions) for error. The minimal number of assertions may be used to test, encounter, or match likely errors in the circuit paths. The minimal number of assertions or properties may be specifically selected to test, encounter, or match outputs that span the partial or entire portion of the circuit (e.g., according to the CED mechanism) for detecting substantially all errors therein. Other or different benefits may be realized.

In one embodiment, a minimal number of assertions may be selected by a user. In another embodiment, a minimal number of assertions may be selected by an automated mechanism that observes common or frequent subsets of errors along crucial paths (e.g., propagating to primary outputs) in a circuit, where the frequent subsets of errors may be determined using real circuit simulations. In some embodiments, a minimal number of crucial inputs, outputs, and/or assertions may be used to detect errors in a circuit, which may be fewer than those used, for example, in conventional systems, and may be used to reduce the system overhead for performing the error detection.

Reference is made to FIG. 1, which schematically illustrates a CED mechanism for protecting a system 100 using assertions according to an embodiment of the present invention. In a first class of embodiments, the assertions may be selected (e.g., at least in part) by a user. System 100 may include a processor 125 for executing processes, a memory 135 for storing the results of processes of processor 125, such as outputs 105 or properties 115 of circuit 110, and a user interface 155 for accepting user input. System 100 may include a circuit 110 having a combinational circuit 120, for example, to execute a CED or other mechanism, run circuit simulations, and/or select a minimal number of crucial inputs, outputs, or assertions. System 100 may include a CED module 140 for operating a CED mechanism for detecting errors in circuit 110 and/or combinational circuit 120.

Combinational circuit 120 may be a portion of circuit 110 that does not have registers (e.g., flip-flops, latches, etc.) and/or memory elements. Combinational circuit 120 may include, for example, logic gates, such as, AND, OR, NAND, NOR, and/or other suitable logic gates. Combinational circuit 120 may include other or different portions of circuit 110.

User interface 155 may include a display, such as a monitor or screen, for displaying to a user data, for example, provided by the simulations, and may include controls, such as a mouse or keyboard, for accepting user-selected data.

During operation, for example, executing an application, program, or mechanism, circuit 110 may generate one or more outputs 105 (e.g., $o_1$, $o_2$ and $o_3$). In some embodiments, for example, when there are no faults or errors in operation outputs 105 may be valid and a certain property 115 $P(o_1, o_2, o_3)$ for outputs 105 may be true. However, when there is a fault or error in operation, the fault may propagate to one or more of outputs 105 (e.g., $o_1$, $o_2$ and $o_3$) and property 115 $P(o_1, o_2, o_3)$ may be false.

Thus, when property 115 $P(o_1, o_2, o_3)$ is determined to be false, an error or fault in system 100 outputs 105 may be detected. When property 115 $P(o_1, o_2, o_3)$ is determined to be true, system 100 outputs 105 may be validated.

In one embodiment, CED module 140 may include a monitor block 150 pre-designated to check outputs 105 to detect if property 115 is true or false. Monitor block 150 may detect substantially all errors in outputs 105 (e.g., $o_1$, $o_2$ and $o_3$) used to generate property 115.

In some embodiments, a set of properties 115 may be selected by a user (e.g., via user interface 155) to be pre-designated for detecting errors in crucial portions (e.g., including a combinational portion 120) of circuit 110. A set of erroneous outputs 105 may be selected by a user (e.g., via user interface 155), which may correspond to one of the two or more user-selected properties. A simulation of circuit 110 may be run for each of the user-selected properties.

Embodiments of the invention may include a user interface 155 to accept two or more of user-selected properties 115 (e.g., stored in memory 160 of assertion checker 130 or memory 135) pre-designated for detecting errors in portions of circuit 110 (e.g., such as combinational circuit 120) and to accept two or more of user-selected erroneous outputs 105 (e.g., stored in memory 160 or memory 135), each of which may correspond to one of the two or more of user-selected set of properties 115. Processor 125 may execute a simulation of circuit 110 for each of the two or more of user-selected properties 115. Assertion checker 130 may detect, for example, in output 105 of the simulation, one of the two or more of user-selected erroneous outputs 105 of circuit 110 for the corresponding one of the two or more of user-selected properties 115. CED module 140 may perform error correction on circuit 110 for the corresponding one of the two or more of user-selected properties 115. After the error correction is performed a circuit may be manufactured, for example, having the design of an error corrected circuit 110.

In some embodiments, the user-selected set of erroneous outputs 105 for each of properties 115 may include contradictory outputs or statements. The output domain resulting from running the simulation of circuit 110 for each of the two or more of user-selected properties may be displayed to a user, for example, on user interface 155. The user interface 155 may display to a user if the output domain of the two or more of user-selected properties 115 is greater than a predetermined threshold. The user interface 155 may display to a user when a predetermined maximum number of user-selected properties are selected. The user interface 155 may display to a user a list of properties from which the user may select an additional property to add to the two or more of user-selected properties. The properties in the list may be customized to have wide output domains in simulation executed therefore. The properties in the list may be customized to detect mostly distinct domains of outputs 105 with a minimal overlap. The erroneous outputs 105 may be detected in a primary output component of circuit 110. In some embodiments, when one of the two or more of user-selected erroneous outputs 105 is detected, the corresponding property 115 is flagged.

For example, when system 100 uses a hardware implementation of a stack, a user may select a property 115, for example, whether or not the output 105 for the stack property 115 is full (e.g., output $o_1$) or empty (e.g., output $o_2$). According to characteristics of property 115, a stack may be empty or full, but not both.

For each operation, monitor block 150 of CED module 140 may be pre-designated to check the stack property 115 to detect if the property 115 is true (e.g., the stack is empty or full) or false (e.g., the stack is both full and empty). In one embodiment, outputs 105 may be highlighted, for example, with flags that indicate whether the stack property 115 is full (output $o_1$) or empty (output $o_2$). For one or more fault inputs, errors may propagate during system 100 operations to generate one or more corresponding erroneous outputs 105 (e.g., a set of both output $o_1$ and output $o_2$). For example, in faulty circuit 110 designs, the "full" and "empty" signal may be high in fault simulations. Since erroneous outputs 105, such as contradictory signals (e.g., the "full" and "empty" signal) typically occur when there is a fault or error in operation, a user may select monitor block 150 to monitor a target contradictory outputs 105 to measure system 100 failures. Monitor block 150 may check for and flag the erroneous outputs 105. In some embodiments, the CED module may execute a CED mechanism to detect and/or correct the source, input, or intermediate occurrences, of related erroneous outputs 105. Error detection and/or correction may be determined using a circuit 110 simulation and may be executed prior to manufacturing or finalizing circuit 110 design (e.g., prior to a silicon circuit 110 production).

Other contradictory signals may include an operation to retrieve an element from an empty stack or to add an element to a full stack. Other contradictory signals may be used and/or selected by a user.

The set of properties 115 and/or erroneous outputs 105 thereof used to detect errors or faults may be referred to as "conditions" or "assertions". The set of properties and/or assertions may be user-selected. In one embodiment, a user interface may provide a user with two or more options from which the user may select.

An assertion checker 130 may use the user-selected assertions, for example, to detect design errors in circuit 110 prior to finalizing the design of, or manufacturing circuit 110. In one embodiment, assertion checker 130 may store a set of correct and/or erroneous assertions in a memory 160. Assertion checker 130 may determine if the inputs and/or outputs generated by simulating circuit 110 are correct (e.g., match the set of correct assertions and/or do not match the set of erroneous assertions in a memory 160) or erroneous (e.g., do not match the set of correct assertions and/or match the set of erroneous assertions in a memory 160).

The assertions, properties, or corresponding erroneous outputs, may be specifically selected by a user to minimize the number thereof used to detect a complete set of potential faults or errors. Thus, the user-selected assertions used for such error detection may include a smaller number or a subset of the assertions used in conventional verification flows, which typically select assertions in a relatively less discriminate manner (e.g., generating a set of assertions having overlapping output domains and potentially inconsequential elements). By specifically selecting assertions (e.g., by a user) for detecting a maximal scope or domain, importance, or number, of errors in circuit 110 design, fewer assertions or CED cycles may be used to achieve the same error detection results. Thus, using a CED mechanisms described according to embodiments of the invention may reduce system 100 overhead (e.g., physical (PHY) layer overhead) for error detection, as compared with conventional CED mechanisms.

Assertions may provide expected or desired circuit results with which to compare to the results of system 100 simulations. A match comparison may verify the operations and design of a path or portion thereof in system 100. A mismatch comparison may highlight abnormal or erroneous operating conditions and/or to detect output errors. By using a minimal number of assertions to test the behavior of system 100, a minimal number of iteration of error detection cycles, comparisons, or checks may be used for detecting errors. The set of assertions may be selected by a user to optimize a trade-off between system 100 overhead and the scope or accuracy of the error detection coverage. Assertions may be selected that may be used to potentially detect a high number of (e.g., erroneous) outputs at a low cost (e.g., computational effort or iterations of an error detection or CED mechanism). Other or different benefits may be achieved.

In one embodiment, a CED mechanism according to embodiments of the invention may be integrated into or used in addition to conventional CED mechanisms using conventional verification flows. For example, an integrated CED mechanism may check assertions of both the conventional CED mechanism and the user-selected assertions of embodiments of the invention. However, in one embodiment, more weight, iterations, or computational effort may be used to check the user-selected assertions, as compared with the conventional CED assertions.

Figure 2:
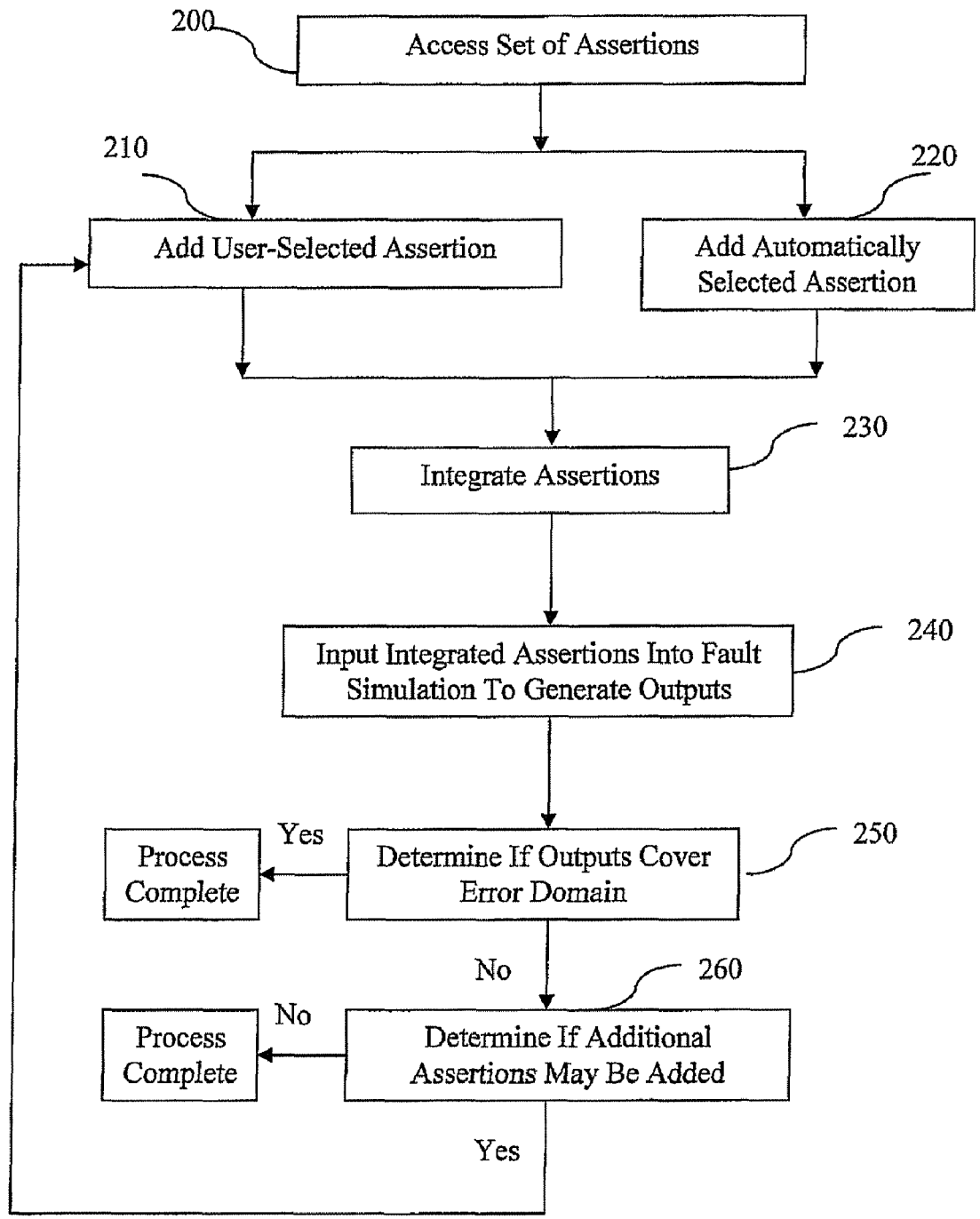
FIG. 2 is a flow chart of a method according to an embodiment of the present invention.

Reference is made to FIG. 2, which schematically illustrates a flow diagram for selecting assertions for a CED mechanism according to an embodiment of the present invention.

In operation 200, a process may access a register transfer level (RTL) including a set of one or more assertions (e.g., from memory 160 of assertion checker 130).

In operation 210, a process may add an assertion, for example, selected by a user, to a set of properties or assertions pre-designated for detecting errors in crucial portions (e.g., combinational portion 120) of circuit 110. The assertion may be stored in, for example, memory 160 of assertion checker 130.

In operation 220, a process may add an assertion, for example, selected by an automated and/or conventional assertion selection mechanism, for example, according to a microarchitecture specification (MAS). Typically, assertions automatically generated and/or derived from the RTL assume the RTL to be correct and therefore do not detect design bugs therein. However, assertions generated from the MAS may detect design bugs in the RTL. Such assertions may be manually derived, for example, by a user, such as a verification engineer.

An alternate or automated CED mechanisms may be integrated with additional CED mechanisms (e.g., in CED module 140) for example described according to embodiments of the invention. In one embodiment, automatically selected assertions (e.g., used for an automated CED) and user-selected assertions (e.g., used for a CED described herein) may be stored and/or used to detect errors with the same importance. In another embodiment, the user selected assertion may be highlighted or flagged, indicating that more weight, iterations, or computational effort may be used to check the user-selected assertions, as compared with the automatically selected assertions. The assertions may be stored in memory 160 of assertion checker 130.

In operation 230, a process may integrate the assertions selected in operations 210 and/or 220 with the set of one or more assertions accessed in operation 200.

In operation 240, a process may input the assertions (e.g., integrated in operation 230) into a fault simulation (e.g., a simulation of circuit 110) to generate one or more outputs having a defined output domain.

In operation 250, a process, for example, executed by an assertion checker, may determine if the one or more outputs generated in operation 240 have an output domain that meets a predetermined condition. For example, the process may determine if the assertions may be used to test or compare outputs having an output domain or fault coverage that is greater than a predetermined value, for example, for covering a large portion of potential or total (e.g., erroneous) outputs of circuit operations (e.g., an error domain). If a process determines that the output domain of the one or more outputs meets the predetermined condition, the process may complete and the RTL may include the assertions added in operations 210 and/or 220 and no others. If a process determines that the output domain of the one or more outputs does not meet the predetermined condition, the process may proceed to operation 260.

In operation 260, a process may determine if additional assertions may be added, for example, to the RTL (e.g., in memory 160). For example, a CED module (e.g., CED module 140) may be allotted a hardware budget that may specify a maximal number of assertions to be used for the CED mechanism. If no additional assertions may be added (e.g., the hardware budget is exceeded) a process may complete and the RTL may include the assertion added in operations 210 and/or 220 and no others. If a process determines that additional assertions may be added (e.g., the hardware budget is not exceeded) the process may proceed to operations 210 and/or 220 and a second additional assertion may be added (e.g., to the RTL).

Other operations or combinations of operations may be used.

Reference is once again made to FIG. 1. A CED mechanism may use assertions selected (e.g., at least in part) automatically by an automated assertions selector 170 and may be customized for circuit 110 based on circuit simulations (e.g., run by processor 125), for example, for detecting frequently recurrent of crucial errors in circuit 110, to maximize error detection in circuit 110 and/or minimize system 100 overhead.

Processor may execute automated assertions selector 170, which may select a minimal number of assertions for detecting a complete set of potential faults or errors. The complete set of potential faults or errors may include, for example, a crucial subset of errors customized for the circuit by an automated mechanism, a number of errors greater than a predetermined threshold, and/or errors that propagate to a crucial portion of circuit 110 such as a primary output of combinational circuit 120.

In some embodiments, processor 125 executes a simulation of at least a portion of an application that provides output data 105 to a primary output of a predetermined combinational portion of circuit 110. Assertion selector 170 may detect a set of inputs which when input into the simulation may generate erroneous output data 105 to the primary output of circuit 110. Assertion selector 170 may automatically select a subset of the set of inputs and the corresponding erroneous output data 105 generated in the simulation thereof. CED module 140 may perform error correction on circuit 110 for the corresponding erroneous input and output data 105 in the subset. The subset of the set of inputs selected may include a minimal set for detecting a pre-determined number of faults in circuit 110. The subset of the set of inputs and the corresponding erroneous output data 105 may be stored, for example, in memory 160 and/or 135.

In some embodiments, assertions checker 130 may include a partial protection scheme, for example, for detecting (e.g., transient) errors in a partial portion of circuit 110 (e.g., such as combinational portion 120).

Assertion checker 130 may use the inputs and outputs 105 of combinational circuit 120 and generate or transmit a signal indicating whether the inputs and outputs 105 of combinational circuit 120 are correct. In one embodiment, assertion checker 130 may determine the correctness of the assertions using, for example, a duplicate and compare technique for determining if the outputs of circuit 110 are the same as those of a duplicated circuit. In another embodiment, assertion checker 130 may determine if the assertions are correct by, for example, matching the assertions to those in the set of correct assertions stored in a memory 160. In another embodiment, assertion checker 130 may use, for example, a codeword-based scheme to determine if the outputs 105 of circuit 110 have code words that match the code words predicted using the inputs of circuit 110. In yet another embodiment, assertion checker 130 may determine if the inputs and outputs of circuit 110 conform to a series of assertions automatically customized for circuit 110.

Each assertion may have a structure, for example, of the form "antecedent→consequent", where if the antecedent is true, the consequent is true. The antecedent in each assertion may be a minterm on a subset of inputs of circuit 110. For a Boolean function (e.g., f(a, b, c)) expressed in a sum of products (SOP) form (e.g., ab+bc+ca), a minterm may be one of the terms in the SOP (e.g., ab or bc, etc.) Each input need not be part of the antecedent. In one embodiment, the antecedent may be a minterm on one or two of the inputs. The consequent in each assertion may be an output of circuit 110 or a complement thereof. An assertion having the structure described herein may include, for example, $i_2 i_3' \rightarrow o_5$, where $i_2$ and $i_3$ may be inputs and $o_5$ may be a corresponding output 105 of circuit 110. For example, $o_5$ has a value of 1, when $i_2=1$ and $i_3=0$. Assertion checker 130 may detect all the faults which propagate to generate erroneous outputs 105 in the consequent when the antecedent is true. For example, assertion checker 130 may detect erroneous assertions having a structure, for example, of the form "antecedent→consequent", where if the antecedent is true, the consequent is false. According to the example described herein, assertion checker 130 may detect all transient faults which propagate to the output $o_5$ when $i_2=1$ and $i_3=0$. The antecedent of the assertion (e.g., $i_2=1$ and $i_3=0$) may correspond to a consequent having, for example, a test vector for a stuck-at fault (e.g., at output $o_5$). In one embodiment, a test vector that detects any stuck-at fault at an output 105 of circuit 110 or the combinational portion (e.g., 120) may be used as (e.g., and converted into a suitable structure of) an assertion on that output 105.

In some embodiments, assertion checker 130 may use a minimal set of assertions with consequents having output domains that cover a large portion of potential or total (e.g., erroneous) outputs of circuit 110 operations for providing circuit 110 with high fault coverage. Using a minimal set of assertions may minimize system 100 overhead, by minimizing the number of iteration of error detection cycles or checks (e.g., at least one for comparing simulation outputs to each assertion) used by a CED mechanisms to detect faults or errors in circuit 110.

In one embodiment, transient fault simulations may be run on circuit 110 to determine the circuit 110 output domain for each of multiple potential assertions. Automated assertions selector 170 may select a set of assertions of a minimal number having a corresponding output domain that covers a crucial portion of circuit 110. For example, automated assertions selector 170 may detect errors that propagate to a primary output of combinational circuit 120 (e.g., or other machine states of a processor). In one embodiment, transient fault simulations may be run using partial or sample segments of an operation or application in circuit 110. Detecting errors in a subset of circuit 110 (e.g., primary output of combinational circuit 120) using a simulation of a subset or segments of applications of circuit 110 may minimize overhead associated with conventional mechanisms, in which outputs to all portions of a circuit generated using random input vectors may be tested for errors.

Automated assertions selector 170 may automatically select, extract, and/or generate assertions for a specific input vector, for example, according to the process that follows. Other processes for automatically selecting circuit customized assertions for a specific input vector may be used. For example, a control assignment (CA) may be defined, as an operation, for example, that assigns values to the specific input vector, which maintains a current value of the net (e.g., or output domain) or the value of the net when the specific input vector is applied. A net (e.g., also referred to as a signal) may be a wire (e.g., or a line connecting two or more gates) in circuit 110. The CA may have a form of a SOP, where each product may define a different permutation or combination of assignments of values to inputs. The product in the CA of a net is typically not a test vector for stuck-at fault at the net since the value at the net may be controlled and there may be no guarantees that the fault may propagate to an output. However, the product of a CA for an output (e.g., of combinational circuit 120) may be a test vector for stuck-at fault at the output since if the output is detected, the propagation condition may be trivially met.

For example, using the CAs of all the inputs for a path (e.g., including a gate or operation) of a circuit, the CA of the corresponding outputs may be calculated, for example, as follows:

1. If the gate has one or more controlling inputs (e.g., inputs that determine corresponding outputs), the CA of each of the corresponding outputs may be the sum of CAs of all the gate inputs which have controlling values.
2. If the gate has all non-controlling inputs (e.g., inputs that typically do not determine corresponding outputs), the CA of each of the corresponding outputs may be the product of CAs of all the non-controlling inputs.

For example, Table 1 illustrates a propagation of CAs for an AND gate in a circuit simulation using inputs $i_1$ $i_2$, and an output, having CAs, $CA_1$, $CA_2$ and $CA_o$ respectively.

TABLE 1

Propagation of CAs for an AND gate

| $i_1 i_2$ | 00 | 01 | 10 | 11 |
|---|---|---|---|---|
| $CA_0$ | $CA_1 + CA_2$ | $CA_1$ | $CA_2$ | $CA_1.CA_2$ |

It may be appreciated that other values, inputs, outputs, CAs, relationships, gates, operations, simulations, and/or propagation tables may be used.

Once the propagation of CAs for a datapath, operation, or gate are defined, automated assertions selector 170 may extract assertions for the outputs of the circuit for a specific input vector, for example, by:

3. Initially, all the nets in the circuit may be ordered topologically (e.g., all the inputs of a gate may be listed in a predetermined location relative to or before the corresponding outputs of the gate).
4. For each net in the ordered list, the following may be determined:
   a. If the net is an input of the circuit, the CA of the net may be the positive literal of the net if the net has a value '1' and the CA may be the negative literal of the net if the net has a value '0', for example, in the simulation vector.
   b. If the net is not an input of the circuit, the CA of the net may be calculated using the CAs of the inputs of the gate driving the net according to, for example, steps 1 and 2, described herein.
   c. If the CA is not in a SOP format, the CA may be converted thereto.
   d. If the SOP of the CA includes number of literals greater or equal to (n+thresh), where n may be the minimum number of literals in the products and thresh may be a parameter of the algorithm, remove the numbers. The resulting SOP of the CA may include only products which have number of literals lesser than (n+thresh).
5. Assertions on the outputs of the circuit may be extracted:
   Each product in the output CA may be an antecedent of a different assertion on that output. If the output has a value '0', then the consequent of the assertions may be the negative literal of the output. Otherwise, the consequent of the assertions may be the positive literal of the output.
6. The CAs of the nets (e.g., reduced in step 4(d)) may be further reduced, for example, to bound the number of terms in the SOP of the CAs that may be calculated from the CAs. For example, products of a CA that have a large number of literals may be removed from the SOP of the CA. In some embodiments, the fewer the number of literals in the antecedent of any assertion, the greater the corresponding output domain and probability of the occurrence or use of the antecedent in circuit simulations. Thus, fewer the number of literals in the antecedent of any assertion, the greater the probability that an assertion may be determined to correspond to or have a useful output domain for detecting errors. Such assertions may be automatically selected extracted as top assertions. However, removing some critical products from the SOP of the CAs may remove some crucial assertions that may detect a large number of transient faults.

Figure 3:
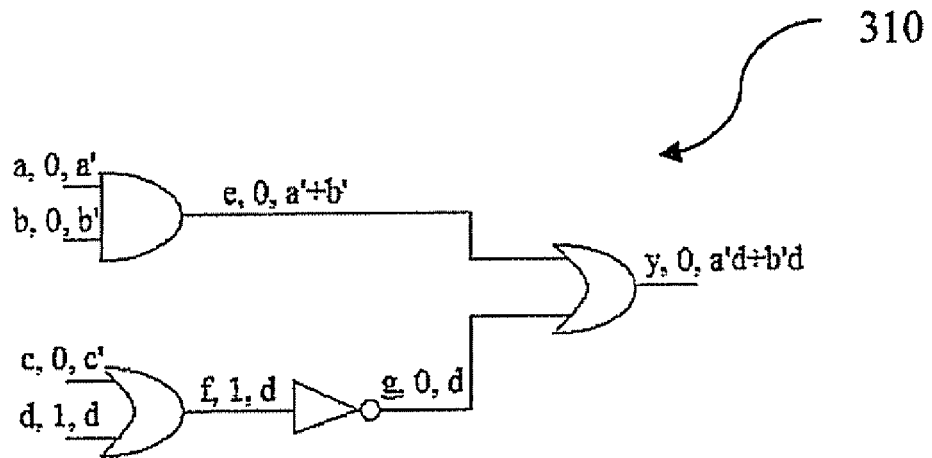
FIG. 3 is a schematic illustration of the propagation of control assignments in a circuit simulation according to an embodiment of the present invention.

Reference is made to FIG. 3, which schematically illustrates the propagation of control assignments (CAs) in a circuit 310 simulation according to an embodiment of the invention. Each net in circuit 310 may have a corresponding vector, such as, for example, a tuple, (x, y, z), where x may be the name of the net, y may be the value of the net, and z may be the CA of the net. Circuit 310 may have inputs a, b, c, and d, and an output y. A vector (e.g., 0001) may be applied to input vector (a, b, c, d) in circuit 310. The CAs of the outputs corresponding to inputs a and b and c and d, operated on in pairs, for example, using an AND gate, may be, a'+b' and c'+d', respectively. The CA of the output y, corresponding to inputs a'+b' and c'+d', may be a'd+b'd. For example, the assertions (a'd→y') and (b'd→y') may be extracted for the given vector, (a, b, c, d). The AND gate may provide an example of the propagation of CAs using controlling gate inputs. The output gate may provide an example of the propagation of CAs using non-controlling gate inputs.

Figure 4:
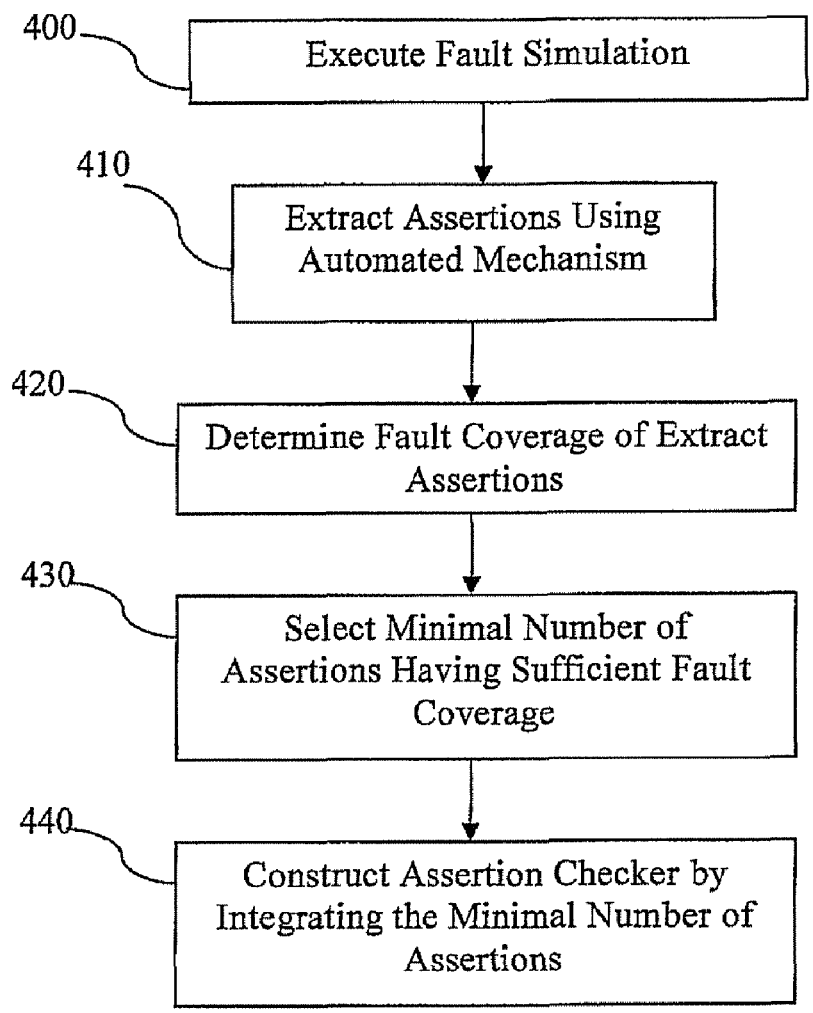
FIG. 4 is a flow chart of a method according to an embodiment of the present invention.

Reference is made to FIG. 4, which is a flow diagram for automatically selecting a minimal number of assertions customized for a circuit 110 using real circuit simulations according to an embodiment of the invention. For example, descriptions of circuit 110 and functional vectors applied to circuit 110 may be inputs for automated assertions selector 170. Once a set of circuit customized assertions is extracted, automated assertions selector 170 may generate a minimal set of assertions covering a predetermined output domain for detecting errors therein. The minimal output domain may be defined by a target reduction in fault escapes. A fault escape may be a fault that propagates to a primary output of the circuit 110 without being detected. Without error detection (e.g., CED), all faults that propagate to primary outputs of circuit 110 may be fault escapes. Using a CED mechanism, some faults may be detected and the number of fault escapes may be reduced. The target reduction in fault escapes may determine circuit 110 fault coverage and may be given by a parameter, for example, determined according to circuit 110 design.

The assertions may be selected by automated assertions selector 170 and stored in memory 160 of assertions checker 130. Assertion checker 130 may test circuit 110 output simulations for correctness, for example, by comparing the selected assertions thereto. The process described herein may be used to detect design errors in circuit 110, for example, prior to finalizing the design or manufacturing of circuit 110.

In operation 400, circuit 110 may execute a fault simulation. A parameter, m, such as a number of transient faults, may be input into each simulation cycle. The transient faults may be input (e.g., or "injected") into a crucial or selected portion of circuit 110 design, such as, combinational portion 120, according to a given fault model (e.g., including single-event transients, cross-talk faults, etc.). Primary outputs of circuit 110 and the inputs of sequential elements (e.g., the outputs of combinational portion 120) may be observed for detecting common of frequent errors along crucial paths in circuit 110. Faults that propagate to the primary outputs of circuit 110 most frequently may be considered important and may be protected to reduce fault escapes. These faults may be protected by checking, for example, the combinational logic where the fault was input or injected. A piece of combinational logic may terminate, for example, in the primary output of circuit 110 or at the input of a flip-flop or latch before the fault effect may be stored in the flip-flop or latch. Combinational logic that terminates at the input of a flip-flop or latch may be referred to as "latched-on".

According to embodiments of the invention, for each fault that propagates to the primary outputs, the outputs of the combinational portion to which the fault propagates may be determined before being first latched on to a sequential element. For each fault that propagates to the primary outputs, the input vector, the fault site, and the outputs of the combinational portion to which the fault propagates may be stored in a fault database. Each fault that propagates to the primary outputs may be detected using assertions on one of the combinational outputs to which the fault propagates to, for example, prior to proceeding to a subsequent stage of the simulation or latching on to sequential element. Masking factors mentioned herein may be inherently considered since typically, only the faults that propagate to the primary outputs may be stored. The sensitivity of the various latches (e.g., and consequently the latch fan-in logic cone or other logic gates) may be determined with respect to fault effects.

In operation 410, automated assertions selector 170 may extract assertions for each unique vector in the fault database, for example, according to embodiments described herein (e.g., in steps 3-6, above). Assertions may be extracted for each combinational output to which a fault input in the vector propagates.

In operation 420, automated assertions selector 170 may determine the fault coverage or the output domain of the extract assertions (e.g., including substantially all corresponding faults detected using each extracted assertion). For example, a fault may be detected using an assertion if the antecedent of the assertion corresponds to the fault input and the consequent of the assertion corresponds to the fault output to which the fault input propagates in the simulation of operation 400. A list of the extracted assertions and the faults detected using the assertions may be stored, for example, in an assertion database.

In operation 430, automated assertions selector 170 may select the minimal number of assertions that may be used to detect a target number of corresponding faults (e.g., having sufficient fault coverage or output domain). The target number may be a number of faults, in which detecting may provide a target reduction in fault escapes. Selecting an absolute minimal number of assertions from the assertion database may use a complex computational model. An approximation model thereof, for example, may be used to select an approximately minimal number of assertions having sufficient coverage for reducing fault escapes. An approximation model for selecting an approximately minimal number of assertions may be given, for example, by the pseudo-code that follows:

```
Mark all the faults in the fault database as undetected.
    while (number of faults detected < target number)
    {
    Pick the assertion from assertion database which
    detects most number of undetected faults.
    Mark all faults detected by this assertion as detected.
    }
```

In operation 440, assertion checker (e.g., assertion checker 130) may be constructed by integrating the minimal number of assertions having sufficient fault coverage. For example, the output of the assertion checker may be a signal having a value of '0' when an input (e.g., a fault) mismatches or invalidates an assertion and a value '1' when an input matches or validates each of the assertions (e.g., selected in operation 430). The assertion checker typically does not detect faults that do not trigger or correspond to any of the assertions (e.g., faults that are outside the fault coverage or output domain of the selected assertions). In some embodiments, these undetected faults may be identified and corresponding assertions may be generated and added, for example, piecemeal. In other embodiments, when undetected faults are few, they may be allowed.

Embodiments of the invention provide CED mechanisms for using a minimal set of assertions to test a partial subset of system output in which errors are likely to occur for detecting system errors with minimal overhead. For example, two classes of embodiments for selecting a minimal set of assertions are described herein. In one class of embodiments, the minimal set of assertions may be selected by a user and in another class of embodiments, the minimal set of assertions may be selected by an automated mechanism detected common errors using real circuit simulations.

In some embodiments, a careful selection of assertions by a user may provide sufficient fault coverage at a relatively cost compared with conventional mechanisms. Since assertion based error detection may be widely used for design verification today, the RTL may be an abundant source of assertions that a user may select, for example, explicitly for checking system design, or implicitly because of coding style. In addition, some assertions may already be verified for correct functionality as part of the standard design flow. Thus accessing or selecting assertions derived from pre-silicon validation environment for checking hardware errors may be readily accessible to a user and may require minimal additional effort for implementing or verifying the minimal set of assertions. Assertion based error detection may be used for hardware CED for supporting the progressive phased-in RAS requirements. In one embodiment, creating, adding, or selecting assertions from the micro-architecture specification (MAS) for the purpose of detecting silicon errors (e.g., in operation 220, described in reference to FIG. 2) may also have the additional benefit of revealing design errors. Since assertions may be used to capture invariant properties of the design. Since RTL bugs may cause assertions that capture invariant properties of the design to be violated, selecting such assertions (e.g., from the MAS) may cause the RTL bugs to be detected.

In some embodiments, when a minimal set of assertions is selected by an automated mechanism detected common errors using real circuit simulations, the assertions typically do not add any substantial performance penalty to the design. The assertions add logic "on the side" and do not introduce any substantial delay in the critical paths of the original design. The mechanism may be completely automated.

Embodiments of the invention may provide assertion based CED techniques for control logic for low-cost solution for detecting errors in random control logic. Embodiments of the invention may provide an increase in RAS ratings for systems using, for example, integrated core architectures including both a multi-core architecture and a SOC architecture (e.g., having graphics and memory controller subsystems).

Embodiments of the invention may provide an algorithm to automatically create custom assertions in the RTL having substantially high fault coverage and low system overhead.

Embodiments of the invention may include a computer readable storage medium, such as for example a memory, a disk drive, or a "disk-on-key", including instructions which when executed by a processor or controller, carry out methods disclosed herein.

While the invention has been described with respect to a limited number of embodiments, it will be appreciated that many variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by skilled in the art that the appended claims are intended to cover all such modifications and changes as fall within the true spirit of the invention.

The invention claimed is:

1. A method comprising:
    accepting a plurality of user-selected properties pre-designated for detecting errors in portions of a circuit, wherein each portion of the circuit comprises at least one logic gate, and each of the plurality of user-selected properties includes an identifier for the at least one logic gate and a value of an input to the logic gate, and at least one of the plurality of user-selected properties identifies a logic gate receiving an input from another logic gate of the circuit;
    accepting a plurality of user-selected erroneous outputs, each of which corresponds to one of the plurality of user-selected set of properties;
    executing a simulation of the circuit for each of the plurality of user-selected properties;
    detecting in the output for the simulation at least one of the plurality of user-selected erroneous outputs of the portions of the circuit for the corresponding one of the plurality of user-selected properties;
    displaying to a user the output for the simulation of the circuit for each of the plurality of user-selected properties if the number of detected erroneous outputs is greater than a predetermined threshold; and
    performing error correction on the circuit for the corresponding one of the plurality of user-selected properties.

2. The method of claim 1, further comprising storing the plurality of user-selected erroneous outputs in memory.

3. The method of claim 1, wherein the user-selected set of erroneous outputs for each of the properties comprises contradictory outputs.

4. The method of claim 1, comprising displaying to a user when a predetermined maximum number of user-selected properties are selected.

5. The method of claim 1, comprising displaying to a user a list of properties from which the user may select an additional property to add to the plurality of user-selected properties.

6. The method of claim 5, wherein each of two or more of the properties of the list is customized for having wide output domains when a simulation is executed therefore.

7. The method of claim 5, wherein each of two or more of the properties of the list is customized for detecting output domains with a minimal coverage overlap.

8. The method of claim 1, wherein the erroneous outputs are detected in a primary output component of the circuit.

9. The method of claim 1, comprising flagging a property when the corresponding user-selected erroneous output is detected.

10. The method of claim 1, comprising manufacturing a circuit having the design of the error corrected circuit.

11. A computer-readable storage medium comprising a set of instructions that when executed by a processor in a computing apparatus cause the processor to:
    accept a plurality of user-selected properties pre-designated for detecting errors in portions of a circuit, wherein each portion of the circuit comprises at least one logic gate, and each of the plurality of user-selected properties includes an identifier for the at least one logic gate and a value of an input to the logic gate, and at least one of the plurality of user-selected properties identifies a logic gate receiving an input from another logic gate of the circuit;
    accept a plurality of user-selected erroneous outputs, each of which corresponds to one of the plurality of user-selected set of properties;
    execute a simulation of the circuit for each of the plurality of user-selected properties;
    detect in the output for the simulation at least one of the plurality of user-selected erroneous outputs of the portions of the circuit for the corresponding one of the plurality of user-selected properties;
    display to a user the output for the simulation of the circuit for each of the plurality of user-selected properties if the number of detected erroneous outputs is greater than a predetermined threshold; and
    perform error correction on the circuit for the corresponding one of the plurality of user-selected properties.

12. The computer-readable storage medium of claim 11, further comprising instructions to cause the processor to store the plurality of user-selected erroneous outputs in memory.

13. The computer-readable storage medium of claim 11, wherein the user-selected set of erroneous outputs for each of the properties comprises contradictory outputs.

* * * * *